United States Patent [19]

Gallup et al.

[11] Patent Number: 5,462,668

[45] Date of Patent: Oct. 31, 1995

[54] USE OF STEAM TO CONDENSATE TO DILUTE BRINE STREAM ADDITIVES

[75] Inventors: Darrell L. Gallup, Chino; John L. Featherstone, El Centro; Carl E. Flint, Yorba Linda, all of Calif.

[73] Assignee: Union Oil Company of California, Los Angeles, Calif.

[21] Appl. No.: 130,112

[22] Filed: Sep. 30, 1993

Related U.S. Application Data

[63] Continuation-in-part of Ser. No. 717,527, Jun. 19, 1991, Pat. No. 5,268,108, and Ser. No. 861,323, Mar. 31, 1992, Pat. No. 5,288,411, which is a continuation-in-part of Ser. No. 717,527, Jun. 19, 19915,268,108.

[51] Int. Cl.⁶ .................. C02F 1/56; C02F 5/10
[52] U.S. Cl. .......... 210/696; 60/641.2; 60/641.5; 166/267; 210/700; 210/701; 210/725; 210/734; 210/747; 210/919; 210/714
[58] Field of Search ............... 60/641.2, 641.5; 166/267, 310; 210/696–701, 713, 714, 723, 724, 726, 728, 734, 747, 727, 919, 725; 252/631, 633

[56] References Cited

U.S. PATENT DOCUMENTS

| | | | |
|---|---|---|---|
| 4,476,930 | 10/1984 | Watanabe | 166/279 |
| 4,500,434 | 2/1985 | Jost et al. | 60/641.2 |
| 4,522,728 | 6/1985 | Gallup et al. | 210/714 |
| 4,537,684 | 8/1985 | Gallup et al. | 210/641.2 |
| 4,615,808 | 10/1986 | Gallup et al. | 210/714 |
| 4,728,438 | 3/1988 | Featherstone et al. | 210/713 |
| 4,830,766 | 5/1989 | Gallup et al. | 252/8.552 |
| 4,869,066 | 9/1989 | Pye et al. | 60/641.5 |
| 4,874,529 | 10/1989 | Featherstone et al. | 210/731 |
| 5,024,769 | 6/1991 | Gallup et al. | 210/721 |
| 5,028,340 | 7/1991 | Gallup | 210/753 |
| 5,032,284 | 7/1991 | Gallup et al. | 210/697 |
| 5,044,439 | 9/1991 | Cenegy et al. | 210/701 |
| 5,061,373 | 10/1991 | Gallup | 210/697 |
| 5,073,270 | 12/1991 | Gallup et al. | 210/698 |
| 5,085,782 | 2/1992 | Gallup et al. | 210/696 |
| 5,098,578 | 3/1992 | Gallup et al. | 210/696 |
| 5,145,515 | 9/1992 | Gallup et al. | 75/712 |
| 5,145,656 | 9/1992 | Gallup et al. | 423/42 |
| 5,167,834 | 12/1992 | Gallup et al. | 210/747 |
| 5,182,027 | 1/1993 | Gallup et al. | 210/696 |
| 5,240,687 | 8/1993 | Gallup et al. | 423/42 |
| 5,246,593 | 9/1993 | Gallup | 210/709 |
| 5,256,301 | 10/1993 | Gallup et al. | 210/747 |
| 5,268,108 | 12/1993 | Gallup et al. | 210/698 |
| 5,288,411 | 2/1994 | Gallup et al. | 210/700 |

*Primary Examiner*—Peter A. Hruskoci
*Attorney, Agent, or Firm*—Charles L. Hartman; William O. Jacobson; Gregory F. Wirzbicki

[57] ABSTRACT

Additives are usually diluted before they are added to a geothermal brine processing stream. It has been found that one preferred diluent is the conditioned steam condensate produced after power generation in the geothermal plants. One class of additives beneficially diluted by the conditioned steam condensate are crystal structure modifiers. When it is diluted with the steam condensate, the heat-sensitive crystal structure modifier is prevented from being degraded by the heat of the brine so that when blended with the geothermal brine the crystal structure modifier can perform its function of inhibiting the precipitation of alkaline earth salts.

7 Claims, 1 Drawing Sheet

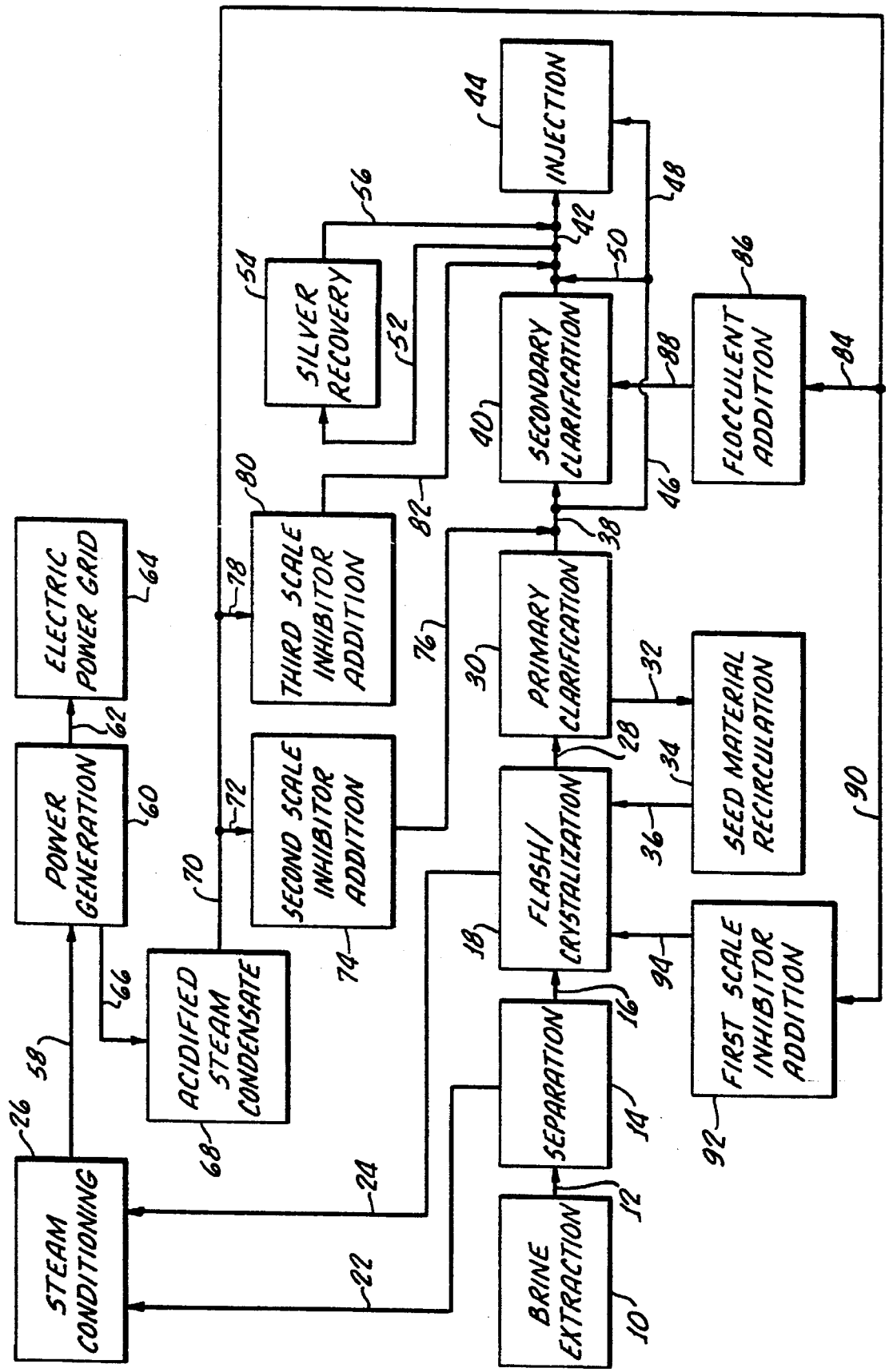

USE OF STEAM TO CONDENSATE TO DILUTE BRINE STREAM ADDITIVES

This application is a continuation-in-part of (1) application Ser. No. 717,527, filed Jun. 19, 1991 now U.S. Pat. No. 5,268,108; and (2) application Ser. No. 861,323, filed Mar. 31, 1992 now U.S. Pat. No. 5,288,411 which is a continuation-in-part of application Ser. No. 717,527, filed Jun. 19, 1991 now U.S. Pat. No. 5,268,108.

BACKGROUND OF THE INVENTION

1. Field of the Invention

This invention relates to methods for utilizing geothermal resources to produce energy, and in particular to methods of introducing scale inhibitors and flocculent needed for smooth operation of a geothermal resource.

2. State of the Art

Geothermal fluids contain vast amounts of thermal energy, which can be used to produce electrical power. In one process for producing electrical power, a naturally pressurized, hot, substantially liquid geothermal brine is recovered from a subterranean reservoir, then suddenly depressurized, or, as termed herein, flashed. This produces steam from the brine while cooling the liquid brine. The cooled geothermal brine is processed further and then typically injected into the ground to replenish the aquifer and prevent ground subsidence.

The hot, highly saline brine removed from the ground is saturated or nearly saturated in many ions and minerals. As the brine is flashed, many of these ions and minerals precipitate out of the remaining liquid solution. Some minerals, typically silicon-containing compounds—particularly silica and silicate-containing minerals, such as iron silicate—form small particles that precipitate slowly. The slow precipitation means that these already precipitating minerals form solids that plug the downstream fluid handling and injection apparatus. Therefore, it is greatly preferred to force these slowly precipitating solids out of the liquid before injection using a flocculent added to the brine in a clarification process. Featherstone U.S. Pat. No. 4,874,529, which Patent is hereby incorporated in full by reference, discusses the problem of slowly precipitating fine particulates and describes the solution of adding a flocculating agent to a two zone clarification process having a primary clarification zone and a secondary clarification zone as the solution to the problem.

However, not all minerals precipitate from the brine solution slowly. Alkaline earth salts (for example, barium sulfate, also known as barite, and calcium fluoride) are among the minerals frequently found in significant concentrations in geothermal brines. Alkaline earth salts tend to precipitate fairly quickly both before the clarification steps, as well as later in the disposal process, even in the injection wells. During the flashing step alkaline earth sulfates (for example, barium sulfate) start to precipitate and continue precipitating down-stream during further handling of the brine as it continues to cool. Barium sulfate presents an annoying problem in many geothermal systems since it starts to precipitate when the cooling brine is still as hot as 340° F., a temperature produced early on in the energy production process, triggering the early precipitation of barium sulfate.

Now, the precipitation of barium sulfate has been implicated in a more serious precipitation problem. Recently, it has been noticed that the crystalline material precipitated at some geothermal sites becomes more radioactive as the site ages. The radioactivity, contained in naturally occurring radioactive materials, or NORMs, is believed to result from tapping into new subterranean formations containing trace amounts of a radioactive alkaline earth sulfate—radium sulfate—which apparently coprecipitates with the chemically similar barium sulfate. It is important to reduce the levels of NORMs in the material that precipitates during the clarification process on the processing equipment to as low a level as possible and inject as much of the NORMs as possible into the earth in the brine stream injected. A solution to this problem is the use of dispersants and crystal structure modifiers to prevent the alkaline earth salts from precipitating. This solution is described in U.S. patent application Ser. No. 717,527, filed Jun. 19, 1991, now allowed, and incorporated herein in full by reference.

In view of the foregoing, it can be seen that geothermal brines contain dissolved components that often cause processing problems because they contain unwanted components that are best left in the solution for subsequent disposal by injection into the earth while also containing unwanted components that are best removed as quickly as possible from the aqueous stream to avoid scaling and contamination of the processing equipment. The NORMs, which are associated with barium sulfate, contaminate the scale formed with radioactive components. However, even though the precipitation of NORMs from the brine stream is to be avoided, the precipitation of silicon-containing components, including silica and silicates, is required for smooth process operation. Consequently, the precipitation of the silicon containing components is induced in at least one clarification vessel by the addition of a flocculating agent.

SUMMARY OF THE INVENTION

In the present invention, the additives (crystal structure modifier and flocculent) added to the brine stream are diluted with steam condensate. These additives are effective to reduce the level of NORMs associated with alkaline earth compounds in solids deposited from geothermal brines and are added at particular points in the processing scheme to maintain the proper concentrations of additives throughout the brine stream before the brine stream is disposed of by injection into the earth. The additives are added to the brine stream at locations selected so that nucleation of dissolved alkaline earth salts is continuously prevented throughout the processing scheme while allowing the silicon-containing components to be removed from solution by flocculation and precipitation in a clarification zone.

One additive that can be beneficially diluted by the present invention is a crystal structure modifier. It has been discovered that the crystal structure modifier can be diluted with the steam condensate that results from the production of power from the geothermal steam to allow addition of the correct amount of crystal structure modifier to result in the correct concentration in the brine stream. The crystal structure modifier can be added rapidly, thereby avoiding a prolonged residence time in the region of high temperature.

A second additive that can be beneficially diluted is a flocculent. The brine stream of the present invention enters at least one clarification stage where a flocculent is added to accelerate precipitation of silicon containing components. The flocculent is a solid and must be diluted, and it has been found that it can also be beneficially diluted with the steam condensate as well.

The steam condensate must be pH modified to make a suitable solvent for both the crystal structure modifier and the flocculent. The use of the steam condensate to dilute the crystal structure modifier and the flocculent provides a means of combining the condensate with the brine stream for disposal by injection while beneficially diluting components that are in need of dilution.

In this invention the preferred crystal structure modifiers are the phosphonoalkylated amines. Other potential crystal structure modifiers include polyphosphonic acids, phosphonoalkylated amines, aminoalkyl phosphonates, phosphate esters, and phosphonocarboxylate.

BRIEF DESCRIPTION OF THE DRAWING

The drawing shows a process flow scheme of a geothermal plant incorporating the process of this invention.

DETAILED DESCRIPTION OF THE INVENTION

Referring to the drawing, a scheme is shown to produce power by a continuous process from geothermal brine. Following first the path of the liquid brine stream, the hot brine is extracted from the ground at the extraction step 10 and introduced through line 12 to wellhead separation step 14 where steam is generated. The remaining hot liquid brine flows through line 16 to a flash crystallization step 18 where more steam is generated, concentrating and cooling the remaining liquid brine even more. Steam generated in the separation step 14 is removed through line 22 to the steam conditioning step 26; similarly, steam removed from the flash/crystallization step 18 is removed to the steam conditioning step through line 24. The warm liquid brine effluent remaining after the flash crystallization step is removed through line 28 and introduced to primary clarification step 30 where silicon-containing components are removed from the brine stream. Seed material to speed the formation of crystals can be removed through line 32 to the seed recirculation step 34 and introduced to the flash/crystallizer 18 through line 36. The effluent in line 38, produced in the primary clarification step 30, is introduced into the secondary clarification step 40 for further removal of silicon-containing components from the brine stream before it is passed through line 42 to the injection step 44 for injection back to the earth. If the effluent removed in line 38 is sufficiently clear it may be directed through line 46 directly to the injection step 44, by-passing the secondary clarification step 40 entirely. If the brine stream contains silver values, the brine stream may be removed from line 52 to a silver recovery step 54 before the brine stream is replaced in line 42 through line 56 for injection. If silver is in the brine stream in line 46, it may be passed through lines 50 and 52 to the silver recovery step 54.

Following now the path of the steam generated from the brine, the steam produced at the wellhead separation step 22 and the flash crystallization step 24 is introduced to a steam conditioning step 26 for cleaning. The cleaned steam is removed through line 58 and used in power generation step 60 to produce electricity, which, in turn is removed by line 62 to the electric power grid 64. The power generation step uses steam turbines to produce power, which, in turn, produces steam condensate which is removed by line 66 to a steam condensate acidification step 68. Since the flashing step to produce steam generated from geothermal sources also flashes both ammonia and hydrogen sulfide, if they are present in the geothermal brine removed from the earth, the steam condensate is typically at a pH different than neutral. Therefore, the steam condensate is pH adjusted (normally, it is acidified as shown) to between about 4 and 6. The acidified steam condensate is then removed in line 70. The acidified steam condensate is used to dilute the first scale inhibitor at the first scale inhibitor addition 92, the second scale inhibitor at the second scale inhibitor addition 74, the third scale inhibitor at the third scale inhibitor addition step 80, and the flocculent at the flocculent addition step 86.

Following the path of the acidified steam condensate as shown in the drawing, it first passes a line 72 that introduces at least some of the acidified steam condensate into the second scale inhibitor addition step 74, and the diluted scale inhibitor produced is introduced into the brine stream in line 38 through line 76. Similarly, acidified steam condensate is introduced into the third scale inhibitor addition step 80 through line 78 for introduction through line 82 into the brine stream in line 42. Optionally, some of the acidified steam condensate may be removed from line 84 and used in the flocculent addition step 86 to dilute the flocculent, which is added through line 88 to the secondary clarifier. Finally, the acidified steam condensate is added through line 90 into the first inhibitor addition step 92 to dilute the crystal structure modifier for addition to the flash/crystallizer 18 through line 94.

In the first crystal structure modifier addition step 92, the second crystal structure modifier addition step 74, and the third crystal structure modifier addition step 80 the same or different crystal structure modifiers may be introduced. A crystal structure modifier is any additive that will inhibit or prevent any or all species found in the brine from producing a scale or other substantially solid material that settles out of the brine. Crystal structure modifiers, exemplified by phosphonoalkylated amines, apparently interfere with the crystal growth of forming particles. Such particles remain entrained or suspended rather than growing, precipitating and contributing to the formation of scale. The crystal structure modifiers are preferably selected from the group consisting of polyphosphonic acids, phosphonoalkylated amines, aminoalkyl phosphonates, and phosphonocarboxylate. Both pure compounds and mixtures and blends of the compositions listed can be used.

The crystal structure modifier added to the steam condensate is typically diluted to between about 10 and 50 wt %, preferably between about 15 and 25 wt %. It is then added to the brine stream at a constant rate, usually enough to add between about 0.5 and 50 ppmw, preferably between about 1 and 10 ppmw, and most preferably between about 2 and 8 ppmw, crystal structure modifier to the brine stream at each addition point through line 94, line 76, and line 82.

The undiluted liquid crystal structure modifier obtained in commerce could be added directly to the brine stream. However, if the pure article of commerce is added, the addition rate must be slow to obtain the correct concentrations of crystal structure modifier in the brine stream. The slow addition rate results in the crystal structure modifier having a long residence times in areas of high temperature leading, in turn, to thermal decomposition of the crystal structure modifier before it is even added to the brine stream. Therefore, it is important to dilute the crystal structure to increase the rate of liquid addition at the crystal structure modifier addition points to prevent thermal decomposition of the crystal structure modifier before addition and prevent no more than 33 percent of the NORMs contained in the geothermal brine stream from precipitating during handling. The water used to dilute the crystal structure modifier must have a low concentration of sulfate ($SO_4^{-2}$) ion or the sulfate ion will combine with the crystal structure modifier before it contacts the brine stream.

In the FIGURE, the steam condensate is shown leading to each dilution point individually. However, if the first scale inhibitor step 92, the second scale inhibitor step 74, and third scale inhibitor step 80 all result in the same dilution of the same inhibitor, then, clearly, the steam condensate could lead to one central dilution point, and the diluted inhibitor would be distributed as shown in the flow scheme.

The flocculent must be diluted as well since the flocculent is obtained as a solid. It is preferred to dilute the flocculent with the steam condensate before being added as a liquid solution to the brine stream. The flocculent is diluted to between about 0.05 and 0.5 wt %, preferably between about 0.1 and 0.2 wt %. The flocculent solutions are pH sensitive and will degrade the flocculent if the pH is high or low. To achieve acceptable life of the flocculent solution the pH of the flocculent solution must be adjusted to between about pH 4 and 6. The flocculent is added to the brine stream at a rate to produce a concentration of flocculent in the brine stream of between 0.1 and 1.0 ppmw, preferably between about 0.2 and 0.6 ppmw thereby forcing at least 25 percent of the silicon-containing components contained in the geothermal brine stream to precipitate.

Both crystal structure modifier and flocculent are added in the overall process. It is unexplained why a crystal structure modifier should inhibit some dissolved solids from precipitating in a system where a flocculent is simultaneously used to accelerate the rate of precipitation of other solids. However, it is observed that adding a crystal structure modifier to the cooling brine stream causes some minerals and ions to remain in solution, while the rate of precipitation of other solids is accelerated by the simultaneous addition of a flocculent. As noted above, crystal structure modifiers can be selected from the group consisting of polyphosphonic acids, phosphonoalkylated amines, aminoalkyl phosphonates, phosphate esters, phosphonocarboxylate, and mixtures and blends of the compositions listed. The preferred crystal structure modifiers are selected from the group consisting of phosphonoalkylated amines and aminoalkyl phosphonates.

The composition of a liquid brine obtained from an on-going geothermal operation in the Salton Sea, California is shown in Table 1 and the composition of the brine condensate from the same source is shown in Table 2 below:

TABLE 1

Typical Composition of Salton Sea Brine Concentrate

| Analyte | mg/l | ppmw | Analyte | mg/l | ppmw |
|---|---|---|---|---|---|
| Ag | 0.1 | 0.1 | Mg | 115.0 | 110.0 |
| As | 16.0 | 14.0 | Mo | <0.01 | <0.01 |
| Au | <0.02 | <0.017 | Na | 67000.0 | 58500.0 |
| B | 390.0 | 340.0 | Ni | <0.2 | <0.17 |
| Ba | 137.0 | 120.0 | $NH_4^+$ | 360.0 | 300.0 |
| Be | <0.01 | <0.01 | Pb | 79.0 | 69.0 |
| Ca | 31500.0 | 27500.0 | Pd | <0.02 | <0.02 |
| Cd | 1.8 | 1.6 | Pt | <0.02 | <0.02 |
| $Cl^-$ | 180,600 | 150,500.0 | Rb | 96.0 | 84.0 |
| Co | <0.02 | <0.02 | Sb | 0.9 | 0.8 |
| Cr | 0.05 | 0.04 | Se | <0.02 | <0.02 |
| Cs | 0.05 | 0.04 | Si($SiO_2$) | 88 (188) | 77 (165) |
| Cu | 2.4 | 2.1 | Sn | <0.01 | <0.001 |
| Fe | 610.0 | 530.0 | Sr | 480.0 | 420.0 |
| Hg | <0.001 | <0.001 | $SO_4^{-2}$ | 120.0 | 100.0 |
| K | 15300.0 | 13200.0 | Ti | <1.0 | <0.9 |
| Li | 204.0 | 178.0 | V | <0.4 | <0.9 |
|  |  |  | Zn | 340.0 | 300.0 |
| pH | 5.5 |  | Br | 120.0 | 100.0 |
|  |  |  | F | 23.0 | 19.0 |

TABLE 1-continued

Typical Composition of Salton Sea Brine Concentrate

| Analyte | mg/l | ppmw | Analyte | mg/l | ppmw |
|---|---|---|---|---|---|
|  |  |  | I | 26.0 | 22.0 |

TABLE 2

Typical Salton Sea Steam Condensate Analysis

| Analyte | mg/kg | Analyte | mg/kg |
|---|---|---|---|
| CATIONS |  |  |  |
| Ag | <0.01 | Li | <0.01 |
| Al | <0.05 | Mg | <0.01 |
| As | <0.001 | Mn | <0.005 |
| B | 2.5 | Mo | <0.002 |
| Ba | <0.005 | Na | 0.09 |
| Be | <0.002 | Ni | <0.04 |
| Ca | 0.05 | Pb | <0.05 |
| Cd | 0.01 | Sb | <0.05 |
| Co | <0.02 | Se | <0.002 |
| Cr | <0.01 | Si | <0.03 |
| Cu | 0.075 | Sr | <0.04 |
| Fe | 0.01 | Ti | <0.01 |
| Hg | 0.0005 | V | <0.01 |
| K | 0.03 | Zn | 0.02 |
| ANIONS |  |  |  |
| $Cl^-$ | 1.0 | $OH^-$ | 50 |
| $CN^-$ | <0.01 | $S^{-2}$ | 35 |
| $CO_3^{-2}$ | 360 |  |  |
| MISCELLANEOUS |  |  |  |
| TDS* | 80 | $NH_3^+$ | 270 |
| pH | 9.2 |  |  |

*TDS means Total Dissolved Solids

It can be seen that the brine is an extremely concentrated solution containing a great many components. It is therefore susceptible to upsets—massive precipitations of dissolved components—caused by the addition of even small amounts of other components to the brine stream. In particular, addition of sulfate ion will cause alkaline earth salts, including naturally occurring radioactive materials (NORMs), to precipitate. The steam condensate contains virtually no $SO_4^{-2}$, but has a high pH (over 9 compared to only about 5.5 for the brine). The condensate is acidified to a pH of between about 4 and 6 by the addition of the proper amount of a strong mineral acid, hydrochloric acid being the particularly preferred acid since it adds no extraneous ions to the condensate solution. Of course sulfuric acid is not preferred for the acidification operation, and is normally to be avoided, since the point of using the steam condensate for diluting the crystal structure modifier is the low concentration of $SO_4^{-2}$ ion in the steam condensate. It should be noted that some of the sulfide ion ($S^{-2}$) present can oxidize to $SO_4^{-2}$ if the steam condensate is allowed to contact the air for any extended period of time; therefore, such contact is to be avoided.

The preferred flocculent are sold in commerce as solids and have the repeating structure represented by formula (1):

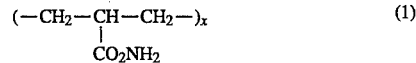

The individual effects of crystal structure modifiers and flocculent are very different with the difference and the magnitude of difference being highly unexpected. Their influence on particles in solution is directly opposite. In the usual mode of operation of this invention, the crystal structure modifier is added both before and after the flocculent. When the crystal structure modifier is added upstream of the clarifier stages and it does not appear to interfere with the action of the flocculent. Likewise, when the crystal structure modifier is added downstream of the flocculent, there is no observed interference caused by the flocculent on the action of the crystal structure modifier. Why the two classes of compounds have such different and exclusive effects in the same system remains a mystery.

The crystal structure modifiers are obtained as technical grade liquid compositions containing large amounts of components (e.g., inert ingredients) not described above. Cost considerations aside, it would be preferred to use pure compounds in the method of this invention. However, the technical grade compositions commercially available are useful in the method of the present invention. The concentration of active ingredients in any particular commercially available material is not generally important. It is only necessary that enough of the material be used to produce the desired concentration of the active ingredient in the brine. Preferably, however, the material will contain at least about 33 wt % of the active ingredients. It is especially preferred that the material contain more than about 50 wt % of the active ingredients.

The preferred crystal structure modifier has the structure, represented by phosphonoalkylated amines, shown in formula (2):

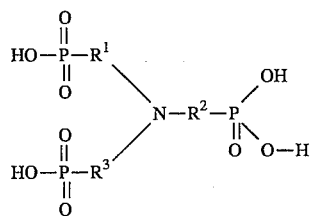

(2)

where $R^1$, $R^2$, and $R^3$ are the same or different and are (a) lower alkylene or (b) $NR^5R^6$, where $R^5$ and $R^6$ are the same or different, and $R^5$ can be a lower alkyl radical, hydrogen atom, or $R^7PO_3H_2$ (where $R^7$ is a lower alkylene radical), and $R^6$ can be a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical). All references to lower alkyl or lower alkylene refers to alkyl or alkylene radicals having from one to ten carbon atoms, preferably between one and six carbon atoms. At least one of $R^1$, $R^2$, $R^3$, $R^5$, $R^6$, $R^7$, or $R^8$ are a lower alkylene group. The various salts, for example, sodium and potassium salts, are also included. One presently preferred compound is phosphonomethyl amine, that is $R^1$, $R^2$, and $R^3$ are all methylene groups.

The structure of a second class of preferred crystal structure modifiers included in formula (2) is shown in formula (3):

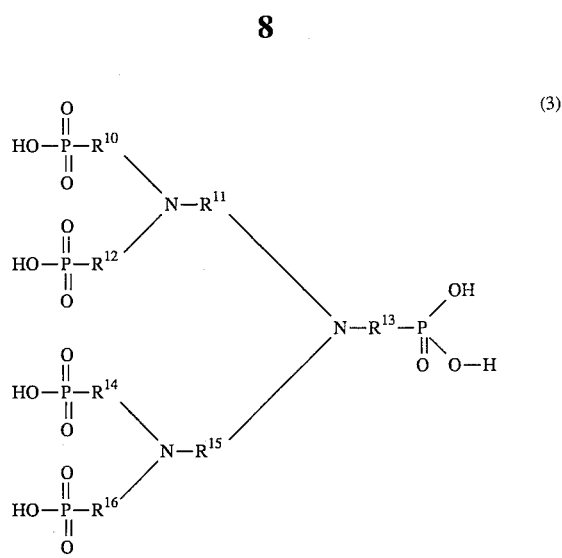

(3)

where $R^{10}$, $R^{11}$, $R^{12}$, $R^{13}$, $R^{13}$, $R^{15}$ and $R^{16}$ are the same or different and are lower alkylene, where lower alkylene is the same as previously described. The various salts, for example, sodium and potassium salts, are also included.

The crystal structure modifier must be added to the brine in an effective concentration, generally, at a rate sufficient to produce total concentrations of crystal structure modifiers in the brine between about 0.5 and 50 ppmw, preferably between about 1 and 10 ppmw, and most preferably between about 2 and 8 ppmw.

The technical solutions referred to above are liquids and can be added directly to the brine stream. However, it is greatly preferred to dilute the crystal structure modifier before addition to the brine stream. One problem with using waters available, such as river water or irrigation water, is that the $SO_4^{-2}$ content of the waters is high enough to combine with a sizable amount of crystal structure modifier. Therefore, the use of the steam condensate, which contains virtually no $SO_4^{-2}$, is ideal since it is readily available. Since the crystal structure modifier is not particularly affected by pH, the acidified steam condensate can be used. Therefore, the same acidic condensate can be used to dilute both the crystal structure modifier and the flocculent. Since different crystal structure modifiers may well be used at different addition points, each particular batch of modifier may have to be made up separately using the steam condensate. However, if the same crystal structure modifier is used at each addition point, only one batch of diluted crystal structure modifier need be made.

This Application for Patent incorporates the disclosure of United States patent application Ser. No. 08/113,114, filed on Sep. 30, 1993, and mailed in the same envelope as the present Application for Patent, in full.

Although this invention has been primarily described in terms of specific examples and embodiments thereof, it is evident that the foregoing description will suggest many alternatives, modifications, and variations to those of ordinary skill in the art. Accordingly, the appended claims are intended to embrace as being within the spirit and scope of invention, all such alternatives, modifications, and variations.

What is claimed is:

1. A method for combining a pH adjusted steam condensate with an additive for adding to a geothermal brine stream containing dissolved components including naturally occurring radioactive materials and silicon-containing components, said method comprising:

a) recovering a portion of a liquid steam condensate stream from a geothermal brine extracted from the earth after power generation;

b) pH adjusting the condensate stream portion to within a range of about 4 to 6 pH units;

c) combining at least one additive to be added to the geothermal stream with the pH adjusted steam condensate to form a diluted additive, wherein said additive comprises a crystal structure modifier or a flocculent; and d) adding the additive to the brine stream to produce a concentration of less than about 50 ppm by weight of additive in the brine stream wherein said combining and adding steps: i) prevent substantial thermal decomposition of said additive when said diluted additive is added to the brine stream and ii) reduce precipitation of one or more of said dissolved component from the brine stream or accelerate precipitation of said silicon-containing components from the brine stream.

2. The method of claim 1 wherein the additive comprises a crystal structure modifier.

3. The method of claim 1 wherein said adding step prevents no more than 33% of the naturally occurring radioactive material contained in the geothermal brine stream from precipitating and wherein said method also comprises the step of injecting the brine stream into the earth.

4. A method for diluting flocculent added to a geothermal brine stream containing dissolved components including naturally occurring radioactive materials and silicon-containing components said method comprising:

a) recovering a portion of a liquid steam condensate stream from a geothermal steam after power generation;

b) pH adjusting the liquid steam condensate stream portion to within a range of about 4 to 6 pH units;

c) combining the flocculent with the pH adjusted liquid steam condensate stream to form a diluted flocculent stream comprising about 0.05 to 0.5 wt % flocculent; and d) adding the diluted flocculent to the geothermal brine stream wherein said combining and adding steps: i) reduce substantial thermal degradation of said flocculent when said diluted flocculent stream is added to the geothermal brine steam and ii) accelerate precipitation of said silicon-containing components from the brine stream.

5. The method of claim 4 wherein adding the diluted flocculent to the geothermal brine stream accelerates at least 25% of the silicon-containing components contained in the geothermal brine stream to precipitate from the brine stream; and wherein the method also includes the step of injecting the brine stream into the earth.

6. A method for preventing the degradation of a crystal structure modifier added to a geothermal brine stream containing dissolved components including naturally occurring radioactive materials, said method comprising:

a) recovering a portion of a liquid steam condensate stream derived from said geothermal brine stream;

b) pH adjusting the liquid steam condensate stream portion to within a range of about 4 to 6 pH units;

c) mixing the crystal structure modifier with the pH adjusted stream portion to form a diluted crystal structure modifier stream having a concentration of less than 25 wt percent crystal structure modifier; and d) adding the diluted crystal structure modifier stream to the brine stream, wherein said mixing and adding steps: i) prevent substantial thermal decomposition of said crystal structure modifier when said diluted crystal structure modifier stream is added to the brine stream and ii) reduce precipitation of one or more of said dissolved component from the brine stream.

7. The method of claim 6 wherein said adding step prevents no more than 33% of the naturally occurring radioactive materials contained in the geothermal brine stream from precipitating and wherein said method also comprises the step of injecting the brine stream into the earth after said adding step.

* * * * *

UNITED STATES PATENT AND TRADEMARK OFFICE
CERTIFICATE OF CORRECTION

PATENT NO. : 5,462,668
DATED : October 31, 1995
INVENTOR(S) : Darrell L. Gallup et al.

It is certified that error appears in the above-indentified patent and that said Letters Patent is hereby corrected as shown below:

On the cover page, Item [54] Title after "Stream" and before "Condensate", delete "To".

On the cover page, Item [63], last line, add a space between "1991" and "5,268,108" and insert before "5,268,108" -- Pat. No. --.

Column 9, claim 1, line 16, delete "component" and replace with -- components --.

Column 9, claim 4, line 30, after "components" and before "said", insert therefor -- , --.

Signed and Sealed this

Thirtieth Day of January, 1996

Attest:

BRUCE LEHMAN

Attesting Officer

Commissioner of Patents and Trademarks